Nov. 14, 1939.　　　　B. F. KELLS　　　　2,179,555
PAPERBOARD BASKET
Filed Feb. 13, 1939　　　　3 Sheets-Sheet 1
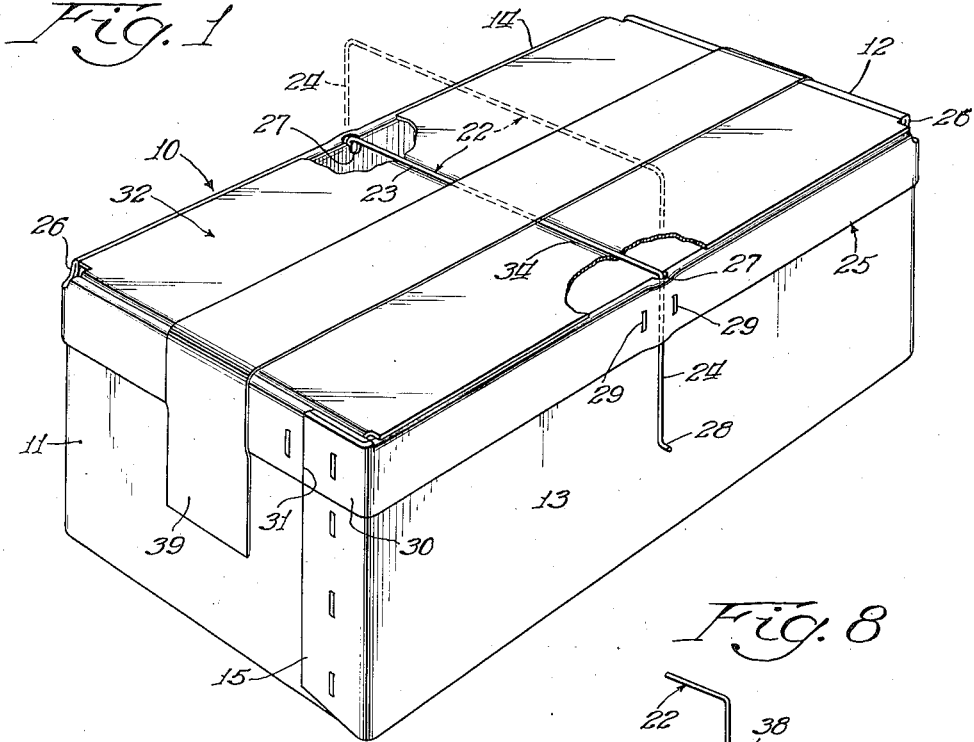
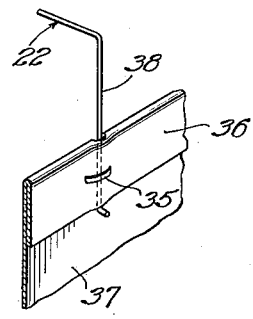
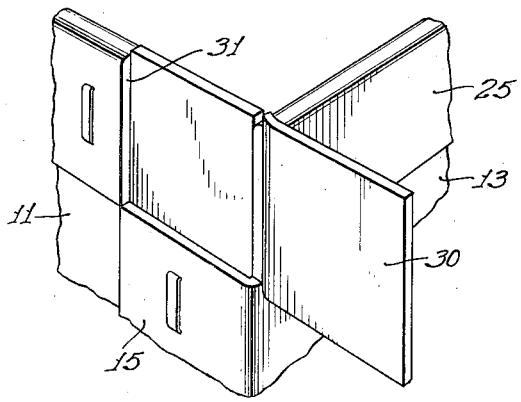
Inventor:
Benjamin F. Kells
By: E. W. Wagonseller
Atty.

Nov. 14, 1939.  B. F. KELLS  2,179,555
PAPERBOARD BASKET
Filed Feb. 13, 1939  3 Sheets-Sheet 2
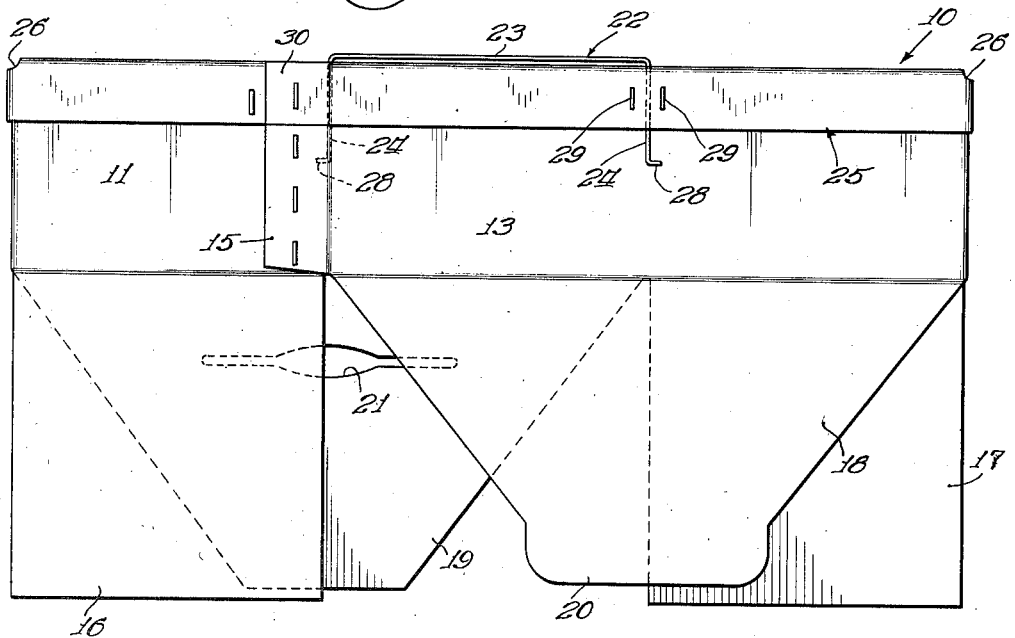
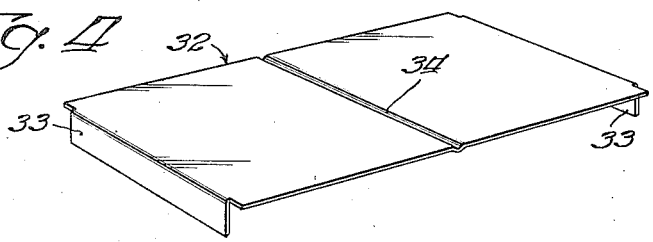
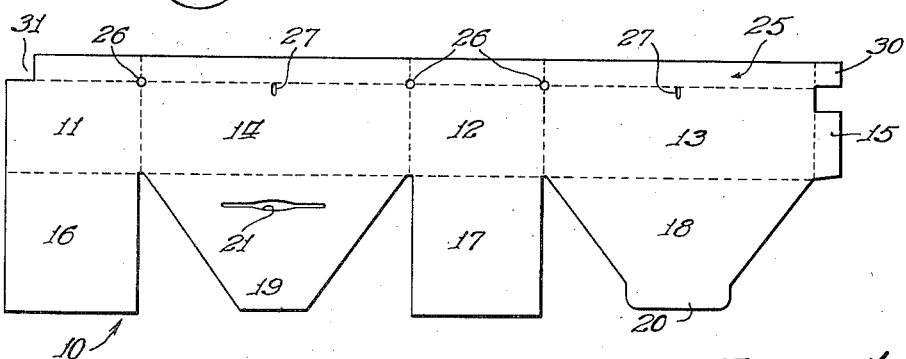
Inventor:
Benjamin F. Kells
By: E.A. Wagonseller
Atty.

Nov. 14, 1939.  B. F. KELLS  2,179,555
PAPERBOARD BASKET
Filed Feb. 13, 1939  3 Sheets-Sheet 3
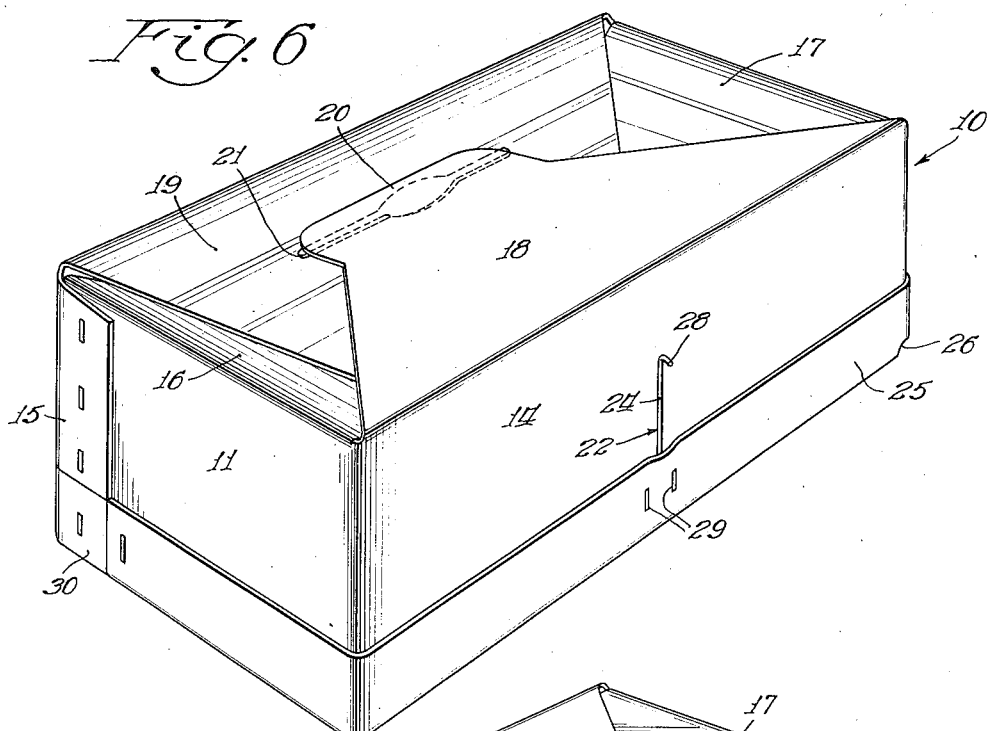
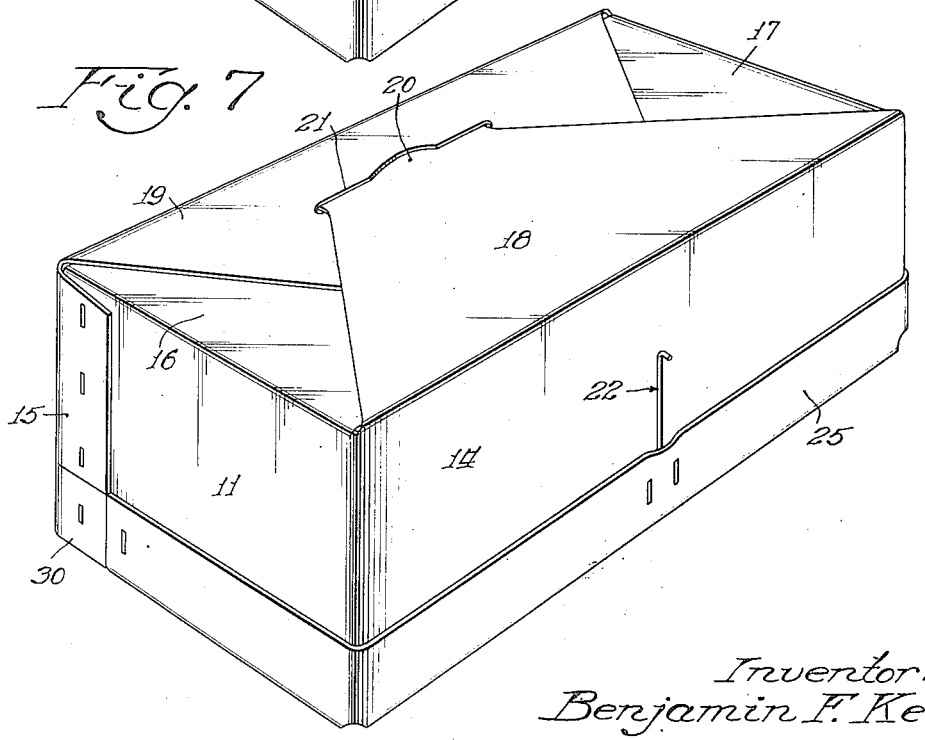
Inventor:
Benjamin F. Kells
By: E. A. Wagonseller
Atty.

Patented Nov. 14, 1939

2,179,555

UNITED STATES PATENT OFFICE 2,179,555

PAPERBOARD BASKET

Benjamin F. Kells, Cincinnati, Ohio, assignor to Container Corporation of America, Chicago, Ill., a corporation of Delaware Application February 13, 1939, Serial No. 256,021

7 Claims. (Cl. 229—39)

The present invention relates to baskets and more particularly to baskets of a collapsible form adapted for manufacture from foldable sheet material, such as paperboard.

One object of the present invention is to provide a basket of the type referred to having a strong, durable construction and one which can be completely prepared in collapsed condition at the box factory and capable of being set up for use with a minimum expenditure of time and effort.

Another object of the invention is to provide a collapsible basket having a handle element so related and associated with the basket parts that it will not interfere with the expanding or collapsing movement of the basket.

Another object of the invention is to provide a handle for a collapsible basket so associated therewith as to enable the handle to be moved from a carrying position to a position in which it will not project substantially above the upper edges of the basket.

Other and more detailed objects will be made apparent as the description proceeds.

In the drawings, illustrating a preferred embodiment of the invention:

Fig. 1 is a perspective view of a basket made in accordance with the present invention, illustrating a closure element in place thereon and illustrating the handle element in a lowered position;

Fig. 2 is a fragmentary detail view of the construction of joint at the upper corner of the basket;

Fig. 3 is a view of the basket in a collapsed condition;

Fig. 4 is a view of a closure element for the basket;

Fig. 5 is a view of the blank from which the basket is preferably formed;

Fig 6 is a view of the basket in an inverted position illustrating the manner of associating the bottom-forming flaps;

Fig. 7 is a view similar to Fig. 6 showing the bottom-forming flaps in engaged position; and Fig. 8 is a fragmentary detailed view showing a modified form of construction for securing the handle to the side walls of the basket.

Similar reference characters throughout the several views indicate the same parts.

The present invention provides a basket particularly adapted for harvesting and marketing of fruits and vegetables such as grapes and tomatoes. Since the basket may be completely formed at the box factory in a collapsed condition with the handle attached thereto, the basket is particularly advantageous for use in the fields where it is undesirable and impracticable to use special box setting up machinery.

The basket, as disclosed herein, comprises essentially a tube having upper reinforced edges to which the handle element is secured and having a triple reinforced bottom thus enabling the basket to withstand considerable wetting, due to accidental crushing of fruits and vegetables packed therein, without undue likelihood of the basket becoming unfit for use.

Referring more particularly to the drawings, the basket, indicated as a whole at 10, preferably comprises two end walls 11 and 12 and two elongated side walls 13 and 14 formed integrally as a part of a single blank of foldable sheet material such as paper or fibre board suitably cut and scored to form the parts mentioned.

For the purpose of securing the interconnected walls in tubular form there is provided at one end of the blank a flap 15, herein shown as extending from side wall 13. This flap is adapted to be secured to the end wall 11 as by means of staples, see Fig. 1.

For the purpose of closing the bottom of the basket a plurality of interlocking flaps are provided. In the present instance the end walls 11 and 12 are each provided with a flap 16 and 17 respectively. These flaps preferably have a length equal to substantially one-half of the length of the basket, whereby when they are brought to an infolded position they will extend across substantially the entire bottom of the basket. The side walls 13 and 14 are provided with flaps 18 and 19, respectively, these flaps having interlocking portions whereby they may be firmly locked together against detachment. For this purpose the flap 18 is tapered from its edges along the wall 13 to a point near its outer edge where a tongue 20 is formed. The flap 19 is formed with a slot 21 adapted to receive the tongue 20 of the flap 18. Flap 19 is also tapered from its inner edge along the wall 14 to its outer extremity.

In order to interlock the bottom flaps the side walls are brought to an expanded condition after which the flaps 16 and 17 are moved to an inner inclined position. See Fig. 7 showing an inverted view of the basket. In a basket proportioned as illustrated the edges of the flaps 16 and 17 will extend substantially to the upper edges of the basket. The flap 19 is then swung inwardly to a position where its sloping edges will lie against the surfaces of the flaps 16 and 17 and this will bring the end of flap 19 substantially flush with the upper edges of the basket. The flap 18 is then swung inwardly until the end of the tongue 20 bears against the surface of the flap 19 between the slot 21 and the base edge of flap 19. The length of the tongue 20 and the distance of the slot 21 from the edge of wall 14 is such that the tongue 20 will not enter the slot 21 until substantial pressure is exerted upon the flap. When pressure is exerted upon the flap 18 the side walls 13 and 14 will be caused to somewhat bow outwardly and the flap 18 will be caused to somewhat bow downwardly, this being possible due to the resiliency of the paperboard material from which the basket is formed. Pressure is continued on the flap 18 until the tongue 20 snaps into the slot 21, whereupon the pressure is released and the flaps 18 and 19 allowed to move to a position more or less in alignment with the lower edges of the basket walls.

The basket is then placed in an upright position and the flaps 16 and 17 are pressed downwardly against the interlocked flaps 18 and 19 thus completing the bottom of the basket.

The handle 22 for the basket is preferably made of generally U-shape with the hand grip portion 23 being preferably straight and with downturned free end portions 24, 24 arranged to be secured to the side walls.

Means are provided for securing the ends of the handle to the side walls of the basket in such manner that the end portions of the handle are free to move vertically with respect to the side walls and so that the securing of the end portions of the handle to the side walls will not interfere with the collapsing of the basket. In the present instance, the means for securing the handle to the side walls is effectively combined with reinforcing means for the basket. This reinforcing means is in the form of downwardly extending portions, herein illustrated as extending entirely around the basket in the form of a collar and being designated as a whole at 25. The reenforcing element or collar 25 is preferably in the form of a relatively narrow strip integral with the upper ends of the side and end walls of the basket. Score lines are impressed in the collar in alignment with the score lines separating the side and end walls to facilitate bending the collar at the corners of the basket.

In order to further facilitate the bending of the corners of the basket after the collar has been folded down along the side and end walls, holes 26, 26 are formed at the intersection of the score lines between the collar and the side walls and score lines which separate the end and side walls. See particularly Figs. 1 and 5.

Before the basket has been formed into a collapsible tube the collar element 25 will be folded down against the side and end walls as illustrated in Figs. 1 and 3.

The ends of the handle are preferably held between the collar and the side walls and, for this purpose, openings 27, 27 are provided at the meeting edges of the collar element and the side walls and centrally of the side walls into which openings the ends of the handle may be inserted. The material of the handle is preferably of such cross-section or conformation as to be readily turnable within the openings 27, 27 when the basket is moved from a collapsed position to a set-up position, or vice-versa. For this purpose a round wire handle is satisfactory. The ends of the handle are provided with laterally projecting portions, herein indicated as outwardly bent portions 28, 28, for the purpose of engaging beneath the lower edge of the collar or reenforcing member 25 at each side of the basket to thus prevent the handle from being accidentally displaced from its association with the side walls. Due to the formation of these retaining portions it is preferable to insert the ends of the handle in place between the collar and the side walls when the basket is in a collapsed position as in this position the handle projections 28, 28 will be directed in substantial parallel alignment relative to the plane of the side walls.

For the purpose of avoiding unnecessary length in the outwardly projecting ends 28, 28 the collar element will preferably be secured to the side walls at points closely adjacent the vertically extending portions of the handle. In the present instance, this result is accomplished by inserting one or more staples through the collar at each side of the box as indicated at 29, 29.

The retention of the collar at points closely adjacent the vertical portions of the handle not only serves to insure retention of the handle by the use of a laterally extending projection of minimum extent, but at the same time the collar is caused to bear frictionally upon the handle so as to keep it in an upwardly extended position as indicated in broken lines in Fig. 1.

While the ends of the collar may be secured in various ways, in the present instance, the joint in the collar is preferably disposed along the line of the edge of flap 15 in the assembled form of the basket. For this purpose the collar is extended as indicated at 30 at one end of the blank and has a cut-away portion of corresponding size at 31 at the other end of the blank. Thus, when the basket has been set up, the flap 30 will fit around the corner of the basket just above the flap 15 and the free end will substantially abut against the end of the collar at the cut-out portion 31. A staple is preferably inserted at this point to hold the flap 30 against the end wall 11.

A closure element, indicated as a whole at 32, is preferably provided for the basket. This closure element is formed, in the present instance, with end flaps 33, 33 adapted to be tucked down into the ends of the basket. The width of the closure element is preferably such as to cause the longitudinal edges of the closure to rest upon the upper edges of the side walls of the basket. The closure is preferably formed with a score line 34 having its concave side directed upwardly. This score line is preferably impressed centrally of the closure and in alignment with the horizontal portion of the handle whereby, when the handle has been moved to a lowered position, as indicated in full lines in Fig. 1, the horizontal portion will lie partly within the concave portion of the score line 34. It is also to be noted that this relationship permits the handle to be brought to a position in which the horizontal portion is arranged to lie substantially flush with the upper edges of the basket, permitting the basket to be handled like any other container having substantially no external projections.

As illustrated in Fig. 8, a single staple 35 extending across the end of the handle may be employed at each side of the basket to retain the collar 36 firmly against the side wall 37 to thus insure the proper retention of the vertical portion 38 of the handle.

Due to the construction of the closure element, it will be securely held in place during transportation. The score line 34 provides a convenient hinge line to permit one end or the other of the closure to be lifted upwardly for inspection of contents.

If desired, a strip of tape 39, may be secured over the top of the basket extending over the closure element and the handle and also extending into overlapping relation with the end walls 11 and 12 whereby the closure element will be firmly held in place.

The manufacture of the basket may conveniently be effected by simply folding down the collar element 25 to a position in which the collar lies flat against the interconnected side and end walls. The ends of the blank are then secured together by stapling the flaps 15 and 30 to the end wall 11. An additional staple is preferably inserted to retain the end of the collar adjacent the cut-away portion 31 to the end wall 11. The basket will thus be formed in a collapsed condition substantially as illustrated in Fig. 3, except for the handle.

In assembling the handle to the collapsed container, it is only necessary to insert the free ends of the handle into the openings 27, 27 and, although not necessary in every instance, the handle is preferably moved to a position in which the horizontal portion is brought to a position substantially flush with the upper edges of the basket walls as illustrated in Fig. 3. Staples 29, 29 are then inserted through the collar and side walls to frictionally retain the vertical portions of the handle against the side walls and to insure the engagement of the laterally extended portions 28, 28 with the downwardly directed edges of the collar or reenforcing member 25, when the handle has been moved to elevated position, after setting up the basket. As thus constructed the collapsed basket is ready for shipment to the user. It is to be understood that a supply of closure elements will also be provided, these elements being preferably shipped in a flat unfolded condition.

It is to be observed that the collar element, in addition to reenforcing the side walls, serves to provide relatively smooth upper edges for the basket. While the collar element has been illustrated as being relatively narrow, it is obvious that the width may be somewhat increased, the essential relationship of the collar to the side walls being that a downwardly directed edge portion is provided adjacent the handle and disposed near the upper edge of the basket and there is also provided a substantially clear area below the handle ends to allow the handle ends to be moved downwardly to their depressed position as illustrated.

In setting up the basket it is only necessary for the user to bring the side and end walls to a rectangular, expanded position, and, while the handle is retained in a lowered position in which the horizontal portion is flush with the edges of the side walls (the basket being also preferably in an inverted position) the bottom closure flaps are assembled with each other as above described. The basket will then be moved to an upright position and the handle may then be pulley up from its depressed position to its elevated position so that the laterally extending portions will come into engagement with the lower edges of the collar portion whereupon the handle is retained in raised position permitting the basket to be carried in the usual way.

After the basket has been filled, the closure may then be applied and the handle brought to a lowered position over the closure thus enabling the basket to be handled in practically the same manner as a box without projecting portions.

From the foregoing it is apparent that the present invention provides a collapsible paperboard basket provided with an efficient form of handle, as well as efficient form of bottom closure element, whereby the basket may be completely assembled at the box plant and shipped to the user who may assemble the basket for use by a mere manipulative operation as distinguished from operations which require insertion of staples, rivets, or the like.

While the present description sets forth a preferred embodiment of the invention, numerous changes may be made in the construction without departing from the spirit of the invention, and it is therefore desired that the present embodiment be considered in all respects as illustrative and not restrictive, reference being had to the appended claims rather than to the foregoing description to indicate the scope of the invention.

I claim:

1. A rectangular basket formed from a single blank of foldable sheet material comprising interconnected side and end walls joined together in tubular form, a relatively narrow collar portion integral with the upper edges of the side and end walls and extending substantially entirely around the top edge portion of the basket, said collar portion being arranged to lie flat against the upper portions of the attached side and end walls to provide a reinforced edge portion around the upper edge of the basket, the lower edges of the side and end walls being provided with extended flap portions arranged to interlock to close the bottom of the basket, the edge portions between the side walls and collar portions being each formed with a handle-receiving opening centrally of the side walls, a U-shaped handle having the free end portions thereof projecting through said openings, said free end portions having a conformation to allow for free angular movement of the end portions within said openings, the ends of the handle being formed with laterally projecting portions engageable beneath the edge of the collar at the opposite sides of the basket, and means for securing the collar portions against displacement away from their attached side walls.

2. A rectangular basket formed from a single blank of foldable sheet material comprising interconnected side and end walls joined together in tubular form, a relatively narrow collar element, formed of sheet material, extending substantially entirely around the top edge portion of the basket, said collar element being retained in position to lie substantially flat against the upper portions of the side and end walls to provide a reinforced edge portion around the upper edge of the basket, the lower edges of the side and end walls being provided with extended flap portions arranged to interlock to close the bottom of the basket, the edge portions between the side walls and collar element being formed with a handle-receiving opening centrally of the side walls, a U-shaped handle having the free end portions thereof projecting through said openings, said free end portions having a conformation to allow for free angular movement of the end portions within said openings, the ends of the handle being formed with laterally projecting portions engageable beneath the edge of the collar at the opposite sides of the basket.

3. A rectangular basket formed from a single blank of foldable sheet material comprising interconnected side and end walls joined together in tubular form, a relatively narrow collar portion integral with the upper edges of the side walls, said collar portion being arranged to lie flat against the upper portions of the attached side walls to form a reinforced edge portion along said walls, the lower edges of the side and end walls being provided with extended flap portions arranged to interlock to close the bottom of the basket, the edge portions between the side walls and collar portions being each formed with a handle-receiving opening centrally of the side walls, a handle having a horizontal hand grip portion with downwardly directed free end portions projecting through said openings, said end portions having a conformation to allow for free angular and longitudinal sliding movement of the end portions within said openings, the ends of the handle being formed with laterally projecting portions engageable beneath the edge of the collar at opposite sides of the basket to support the basket when lifted by the handle but allowing the handle to be depressed to a position in which the hand grip portion will be disposed substantially flush with the upper edges of the side walls.

4. A basket formed of foldable sheet material, comprising four interconnected walls, interlocking bottom-forming flaps formed on a plurality of the lower edges of the walls, a relatively narrow extended portion formed on at least two opposite walls, said extended portions being adapted to be folded down against their attached walls, the edge portions between said sides and extended portions being each formed with a handle-receiving opening centrally of said opposed walls, a U-shaped handle having the free end portions thereof projecting through said openings, the ends of the handle being formed with laterally projecting portions engageable beneath the edge of the extended portions at the opposite sides of the basket, and means for securing the extended portions adjacent the handle against displacement away from their attached walls.

5. A rectangular basket formed from a single blank of foldable sheet material comprising collapsible, interconnected side and end walls joined together in tubular form, a relatively narrow collar portion integral with the upper edges of the side walls, said collar portion being arranged to lie flat against the upper portions of the attached side walls to form a reinforced edge portion along said walls, a closure for the bottom of the basket, the edge portions between the side walls and collar portions being each formed with a handle-receiving opening centrally of the side walls, a handle having a horizontal hand grip portion with downwardly directed free end portions extending from the horizontal portion and projecting through said openings, said end portions having a conformation to allow for free angular and longitudinal sliding movement of the end portions within said openings, the ends of the handle being formed with laterally projecting portions engageable beneath the edge of the collar at opposite sides of the basket to support the basket when lifted by the handle but allowing the handle to be depressed to a position in which the hand grip portion will be disposed substantially flush with the upper edges of the side walls.

6. A collapsible basket formed of foldable sheet material, comprising four walls interconnected in tubular form, a bottom-forming member operatively associated with said walls, a relatively narrow extended portion formed on at least two opposite walls, said extended portions being adapted to be folded down against their adjacent walls, the edge portions between said walls and extended portions being each formed with a handle-receiving opening centrally of said opposed walls, a U-shaped handle having the free end portions thereof insertable through said openings, the ends of the handle being formed with laterally projecting portions engageable beneath the edge of the extended portions at the opposite sides of the basket, and means for securing the extended portions adjacent the handle against displacement away from their attached walls.

7. A collapsible basket formed of foldable sheet material comprising four interconnected walls, a bottom-forming member operatively associated with said walls, a reenforcing member formed on at least two opposite walls, said reenforcing members being integral with the upper edge of said walls and being adapted to be folded down against said walls, the edge portions between said walls and said reenforcing members each formed with a handle-receiving opening centrally of the respective walls, a generally U-shaped handle having a straight horizontal portion and having free end portions, the latter portions projecting through said openings, the free ends of the handle being formed with laterally projecting portions, the reenforcing members being each shaped to present a substantially clear area below the handle ends and presenting a downwardly directed edge portion adjacent the handle and disposed near the upper edge of the basket, said handle ends being of a conformation whereby they are free to move angularly within the openings and also free to move vertically therein to enable the horizontal portions of the handle to be depressed substantially flush with the upper edges of the adjacent walls, said laterally projecting portions on the ends of the handle being engageable beneath the downwardly directed edge on the reenforcing members, and means for securing the reenforcing members to their attached walls at points closely adjacent the vertical portions of the handle to prevent displacement of such members away from said walls, whereby the vertical portions of the handle are frictionally held against said walls.

BENJAMIN F. KELLS.